US010308005B2

(12) United States Patent
DeFries

(10) Patent No.: US 10,308,005 B2
(45) Date of Patent: Jun. 4, 2019

(54) DOUBLE ENDED HAND TOOL

(71) Applicant: Kellie DeFries, National City, CA (US)

(72) Inventor: Kellie DeFries, National City, CA (US)

(*) Notice: Subject to any disclaimer, the term of this patent is extended or adjusted under 35 U.S.C. 154(b) by 0 days.

(21) Appl. No.: 14/641,208

(22) Filed: Mar. 6, 2015

(65) Prior Publication Data
US 2015/0250274 A1 Sep. 10, 2015

Related U.S. Application Data

(60) Provisional application No. 61/949,293, filed on Mar. 7, 2014.

(51) Int. Cl.
B25B 9/00 (2006.01)
B25F 1/02 (2006.01)
A44C 17/04 (2006.01)
B25B 11/00 (2006.01)
B25B 33/00 (2006.01)
B32B 38/18 (2006.01)

(52) U.S. Cl.
CPC ............ B32B 38/18 (2013.01); A44C 17/043 (2013.01); B25B 9/00 (2013.01); B25B 11/007 (2013.01); B25B 33/00 (2013.01); B25F 1/02 (2013.01); Y10T 29/49837 (2015.01); Y10T 156/18 (2015.01)

(58) Field of Classification Search
CPC ............ Y10T 29/49837; Y10T 156/18; A44C 17/043; B25B 9/00; B25B 11/007; B25B 33/00; B25B 27/00; B25F 1/02; E01H 1/12; E01H 2001/1233
See application file for complete search history.

(56) References Cited

U.S. PATENT DOCUMENTS

| 3,797,875 | A | * | 3/1974 | den Hamer | B25B 27/00 221/210 |
| 8,240,731 | B2 | * | 8/2012 | Roszak | E01H 1/12 294/212 |
| 2005/0161961 | A1 | * | 7/2005 | Ruff | B25B 9/00 294/212 |
| 2009/0242117 | A1 | * | 10/2009 | Gupta | A44C 17/043 156/297 |

* cited by examiner

Primary Examiner — Alex B Efta
(74) Attorney, Agent, or Firm — Braxton Perrone, PLLC

(57) ABSTRACT

A double ended hand tool created to pick up place and position flatback crystals, gems or other tiny items is disclosed. The tool contains a hollow, conical end which securely encases each crystal allowing the operator to easily position the crystal with no slip. The tool has a first end and a second end coupled by a shaft. The first end has a wax tip which allows the user to pickup crystals or other small items. The second end has a hollow narrow extended portion which allows the users to manipulate the crystal or other small items.

11 Claims, 5 Drawing Sheets

DOUBLE ENDED HAND TOOL

PRIORITY

This application claims priority to provisional patent application 61/949,293 filed Mar. 7, 2014, the entirety of which is incorporated herein by reference.

BACKGROUND OF THE INVENTION

Technical Field

The present invention relates to a system and method for a double ended hand tool.

Description of Related Art

Tiny crystals are difficult to pick up and place into artwork. A new facet design by Swarovski makes the small crystals taller and with a smaller table (the top flat facet) they are sharper. The sharpness shreds many pick-up tools and creates positioning problems when working with most other tools. Other hand tools, have flat or pointed ends that can easily slip OFF the crystal facet. Consequently, there is a need for a tool which allows an operator to position and place the crystal with no slip.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

As stated above, tiny crystals are difficult to pick up and place into artwork. A new facet design by Swarovski makes the small crystals taller and with a smaller table (the top flat facet). Accordingly, the new crystals are sharper. The sharpness shreds many pick-up tools and creates positioning problems when working with most other tools. The invention claimed here solves this problem.

In one embodiment the tool contains a hollow, conical end which securely encases each crystal allowing the operator to easily position the crystal with no slip. It can aide with crystals of virtually any size, including crystals of size ss3-ss40.

Figure 1A:
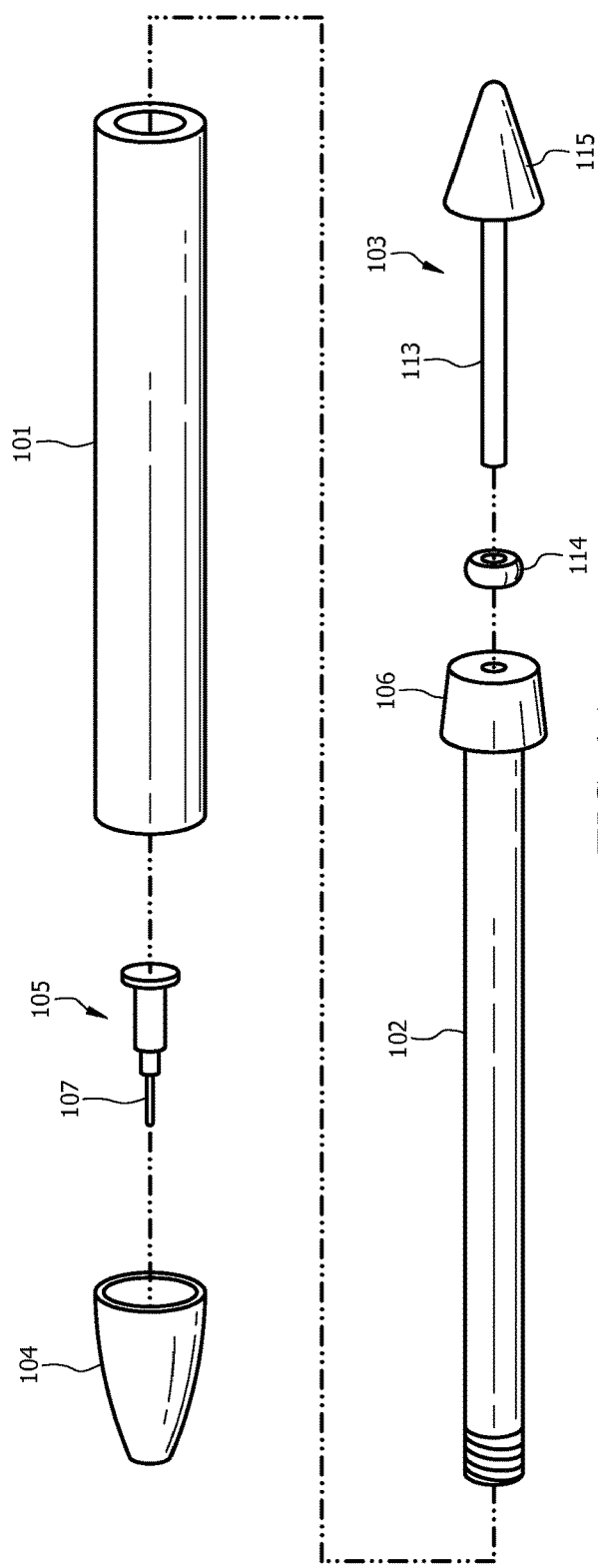
FIG. 1A is a view of a tool in one embodiment.
Figure 1B:
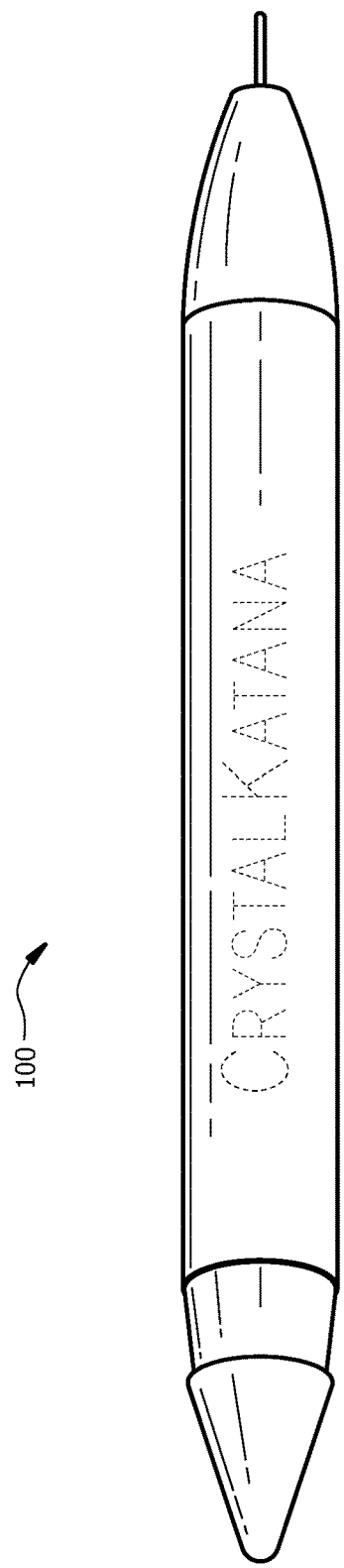
FIG. 1B is an exploded view of the tool in FIG. 1A in one embodiment.

FIG. 1A is a view of a tool in one embodiment. FIG. 1B is an exploded view of the tool in one embodiment. The size of the tool 100 can vary depending upon the application. In one embodiment the tool 100 is sized similar to a pen or pencil such that it can be operated with a single hand. In one embodiment the tool 100 is between about 3 and 8 inches in length. In one embodiment the tool 100 is between about 4 and 7 inches in length. In one embodiment the tool has a diameter of between about 0.25" and 0.5". In one embodiment the tool 100 comprises a double ended hand tool. A double ended hand tool, as used herein, refers to a tool which has features on both ends, as will be discussed in more detail below.

As depicted in FIG. 1A, the tool 100 comprises a wax tip 103 at a first end and an applicator 105 at a second end. As depicted, the wax tip 103 comprises a wax portion 115 at a first end and a tubular shape 113 at a second end. In one embodiment the wax portion 115 comprises a conical shape. In one embodiment, the wax portion 115 at the first end can comprise any shape which results in a pointed end. As will be discussed in more detail below, the tubular portion 113 of the wax tip 103 secures and couples the wax tip 103 within the tool 100. The tubular portion 113 can comprise any elongated shape which secures the wax tip 103 to the connector 102.

The first end of the tool 100, the top side as depicted in FIG. 1, comprises a wax tip 103 which is used to pick up the crystals or other small items. While an embodiment will be described in reference to picking up a crystal, this is for illustrative purposes only and should not be deemed limiting. Small items other than crystals can be used, as will be discussed in more detail below. Virtually any small craft items including crystals, beads, jewelry, etc., can be placed with the tool described herein.

In one embodiment the wax has sufficient adhesion to adhere the crystal or other small craft item but not so much adhesion as to prevent release when the crystal or other small craft items comes into contact with the glue. The wax can comprise a variety of waxes. In one embodiment, the wax comprises a 1:1 ratio, 4 oz/4 oz in each batch of 119012, SPRUE WAX 2-S9 GREEN and 119021, FERRIS 12 RED. In one embodiment, the green wax provides the necessary tackiness. This is what provides the wax the ability to pick up and retain the crystals. Thus, in one embodiment, the green wax provides the necessary adhesion to temporarily adhere the crystal or other small item. In one embodiment, the red wax provides the necessary stability. Prior art waxes become brittle and thereafter crumble. Bees wax, for example, smears leaving behind an undesirable residue. The red wax prevents this residue by providing a wax which does not crumble during shipping, storage, or use. The combination of these two waxes, with each of their advantages, results in a superior wax which is both tacky and stable.

In one embodiment the wax further comprises 1 black wax dye chip to provide the desired color. This formulation is for illustrative purposes only and should not be deemed limiting.

As discussed, in one embodiment and as depicted, the first end of the wax tip 103 comprise a conical shape. This shape provides a sufficient point to adhere crystals. As noted, in some embodiments the crystals are very small. A conical shape allows the wax tip 103 to accurately and select the desired crystal. The base of the wax tip 103 can vary. In one embodiment it has a diameter which approximates the diameter as the rest of the tool 100. In one embodiment the base of the wax tip 103 has a diameter of about 0.5 inches. The tip of the wax tip 103 can vary depending upon the desired application. For example, a finer tip allows smaller items to be picked up and positioned. The tip of the wax tip 103 can vary from about $1/8^{th}$ of an inch to less than $1/16^{th}$ of an inch in diameter.

On the second end of the wax tip 103, on the opposite end of the first end, is the tubular end. The tubular end of the wax tip 103, in one embodiment, couples and connects with the connector 102. This secures the wax tip 103 to the tool 100. In one embodiment the tubular end of the wax tip 103 is dipped into wax to create the best bond with the wax tip 103. Further, dipping the tubular end of the wax tip 103 into wax increases friction and adherence of the wax tip 103 with the connector 102. Also depicted in FIG. 1A is the grommet 114. The grommet fits over the tubular end 113 of the wax tip 103 and provides increased snug and fit within the connector 102. The grommet 114 can comprise virtually any material of any desired size. In one embodiment the grommet 114 comprises a rubber or plastic.

The connector 102 couples the wax tip 103 to the applicator cover 104 and the applicator 105. As depicted the connector 102 comprises a hollow tubular device. The connector 102 couples to the wax tip 103 at a first end and to the applicator cover 104 on the opposite end. In one embodiment, and as depicted, the connector 102 couples to the applicator cover 104 via threading.

The connector 102 is inserted through a shaft 101 to help create proper posture and provide for a more easily gripped tool. In one embodiment the shaft 101 comprises recycled materials, plastic, metal, bamboo, and combinations thereof.

The shaft 101 can be secured via any method or device known in the art. In one embodiment the connector 102 comprises an enlarged diameter 106 at the first end. Accordingly, when the connector 102 is inserted through the shaft 101, the first shaft 101 is secured by the connector's 102 enlarged diameter 106 at the first end. Thereafter, when the applicator cover 104 is secured, via threading for example, then the shaft 101 is locked in place between the enlarged diameter 106 and the applicator cover 104.

Returning back to FIG. 1B, the tool 100 further comprises the applicator 105 located on the second end of the tool 100. The applicator 105 can comprise virtually any material including but not limited to plastic, metal, etc. As described above, in one embodiment the applicator cover 104 is removable via threads or such device. In one embodiment the applicator cover 104 has threading which correspondences to threading on the hollow connector. Once the applicator cover 104 is coupled to the connector 102, the applicator 105 is secured in place. In one embodiment the applicator cover 104 comprises a hole through which the narrow extended portion 107 extends. However, the applicator cover 104 can be removed, and the adapter 105 be replaced with a different size to better suit the specific crystal and application process. This offers increased efficiency and customization.

In one embodiment, the applicator 105 is a precision conical tube that allows the operator to firmly push and position each crystal as needed in the gluing process without disturbing other crystals around it. As noted, the tool can comprise applicator 105 of different sizes allowing the operator to better control the placement of the items. The applicator 105 allow the tool to be customized to different sizes and shapes of items. The applicator 105 comprises a narrow extended portion 107 which allows the operator to easily position the crystal with no slip. The narrow extended portion 107 can be hollow or solid and it acts as a precious tool to allow the user to move and position the crystals to their desired location. In one embodiment, the applicator 105 can aide from crystal sizes ss3-ss40. In another embodiment, the applicator 105 can aid with virtually any standard size crystals in the industry. The extended portion 107 is different from the prior art tools which slip off the crystal facet causing damage to the surface being glued on or the crystals already being glued on the surface treatment. The claimed invention differs from what currently exists.

Figure 2:
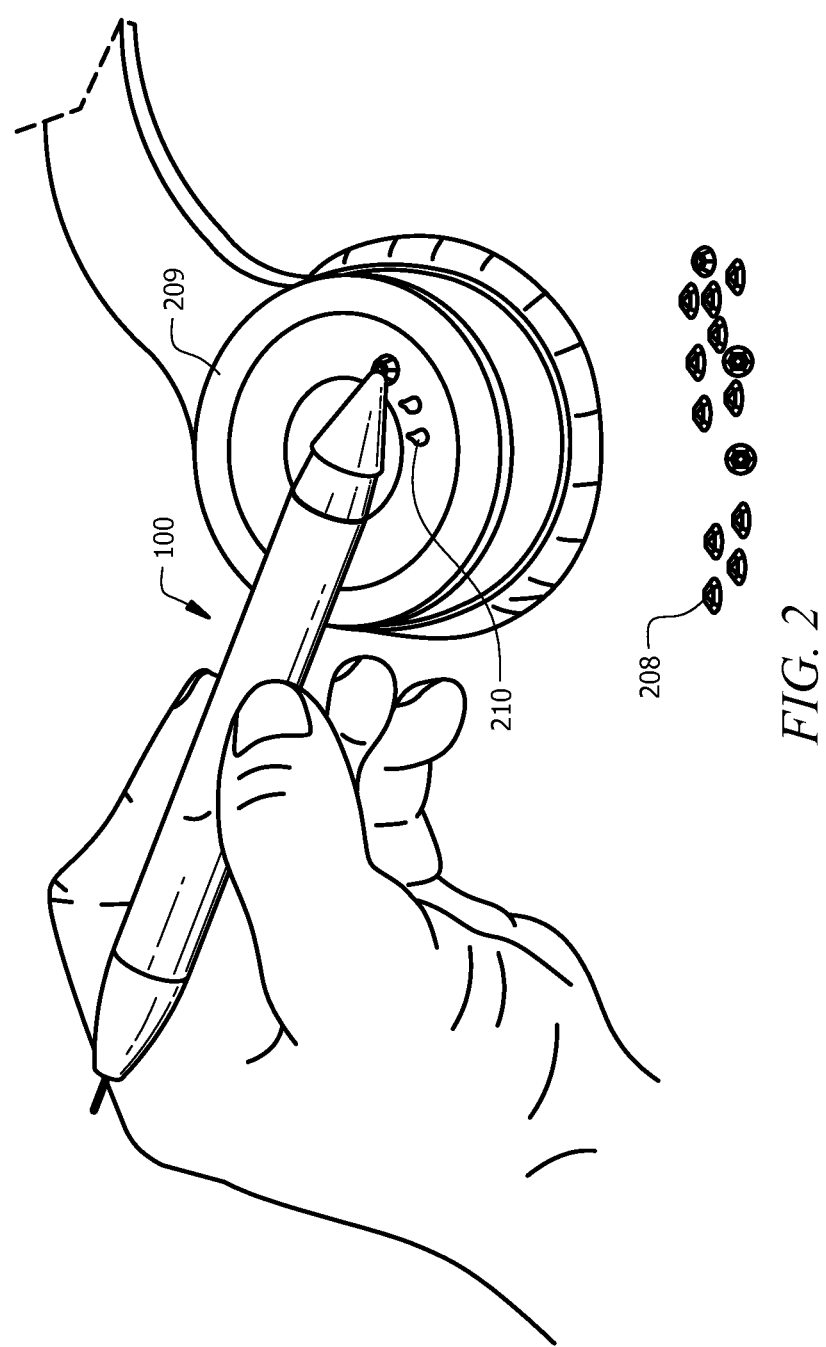
FIG. 2 is a perspective view of the tool in use in one embodiment.

FIG. 2 is a perspective view of the tool in use in one embodiment. As shown the tool 100 is being used to apply a plurality of crystals 208 onto an object 209. The crystals 208 can comprise virtually any type of crystals or small craft item. These include but are not limited to Flatback, Swarovski, Preciosa, Korean, DMC, Austrian, Czech, glass, rhinestones, crystals, acrylic, Fancy stones, (Pointed back), Swarovski, Preciosa, Korean, DMC, Austrian, Czech, glass, rhinestones, crystals, acrylic, Real Gemstones, and real diamonds. The object 209 can comprise any object of virtually any size, shape, and texture. The object 209 can comprise any object which a user desires to decorate. Possible objects include, but is not limited to, clothing, computers, scrap books, notebooks, frames, pictures, artwork, suitcases, etc. As depicted, the object 209 comprises headphones.

As shown, in one embodiment, the first step is applying an adhesive 210. The adhesive can comprise any adhesive known in the art. These include glue, tape, adhesive paint, etc. In one embodiment the adhesive 210 comprises a liquid adhesive, such as a glue, which hardens upon drying. The type of adhesive 210 will depend upon the desired application.

The adhesive 210 can be applied via any method or device known in the art. In one embodiment the adhesive 210 is applied via a syringe which allows the adhesive to be accurately placed.

As depicted in FIG. 2, the object 209 has several points where adhesive 210 has been applied to the object 209. The user has used the wax tip 103 to grasp one crystal 208. Very little pressure is needed to temporarily adhere the crystal 108 to the wax tip 103. Thereafter, the user brings the crystal 208 into contact with the adhesive 210. Because the adhesion of the adhesive 210 is greater than the adhesion of the wax tip 103, the crystal 208 adheres to the object 209. If necessary, the tool 100 can be rotated and the adapter 105 can be used to position the crystal 208. The process is repeated as many times as necessary to adhere the crystals 208 to the object 209.

While the examples have primarily used crystals to demonstrate the novelty and use, this is for illustrative purposes only and should not be deemed limiting. Virtually any small items in any industry can be used, for example, nail art, stained glass, mosaics, sequins, pressed flowers, model building parts such as model trains or cars, etc. As can be seen, its use is virtually endless.

As noted, the tool and method discussed herein is a significant improvement over the prior art. Using the standard wax on a stick is very hard on your fingers when trying to pick up a large amount of very small crystals. This tool eliminates that problem by becoming a proper holder for the wax by placing it in the user's hand with ease and comfort. Further, many other tools have a pointed or slanted end for positioning crystals which now, due to the change of the top-table facet of the crystals, slide off the crystal you are trying to position, and possibly disturbing the other crystals that the operator has just positioned. This also helps scrapbookers with fine paper diecuts and does not mar or scratch the items they are picking up and placing with the tool 100.

Figure 3:
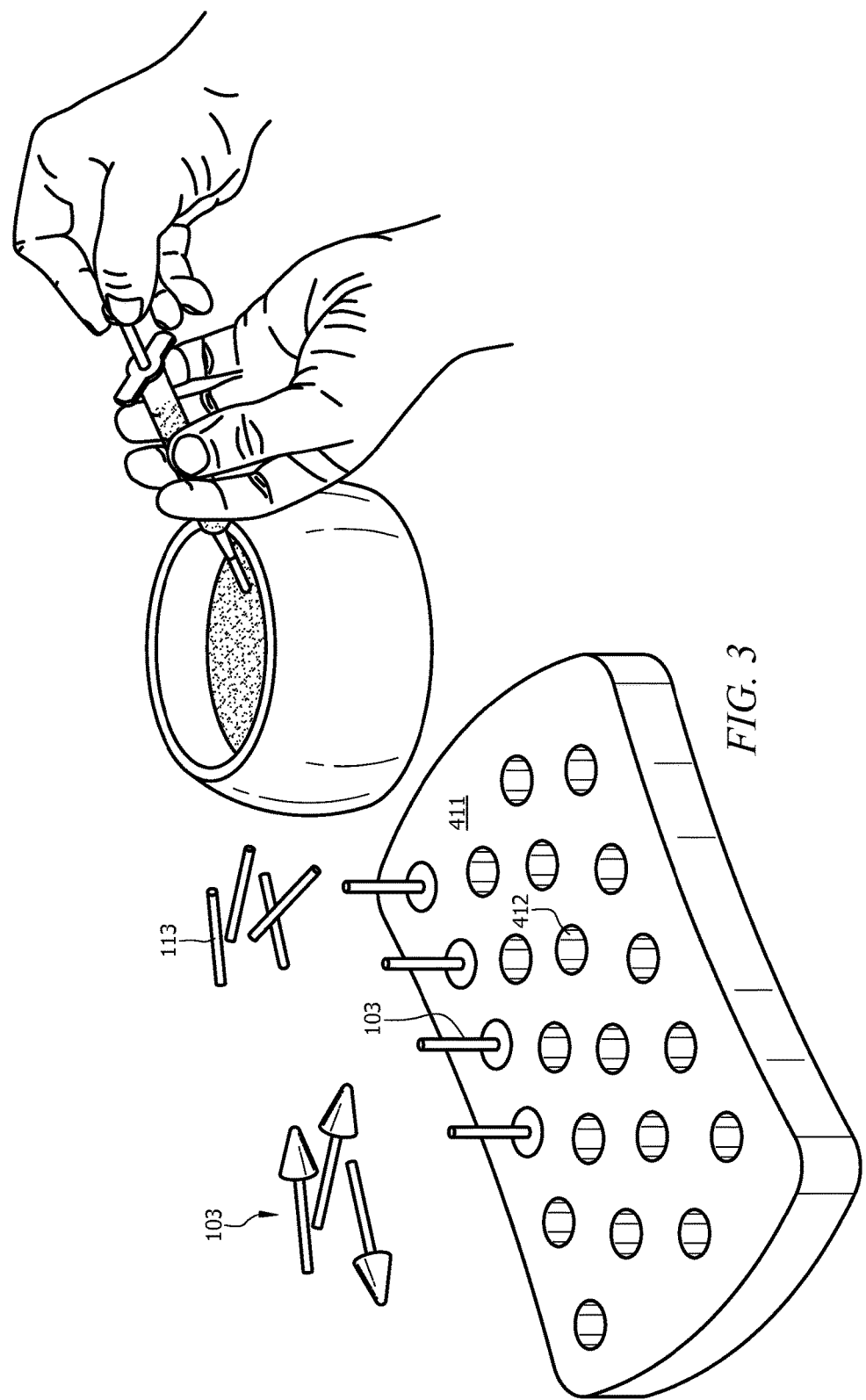
FIG. 3 is a perspective view of the wax tip being manufactured in one embodiment.
Figure 4:
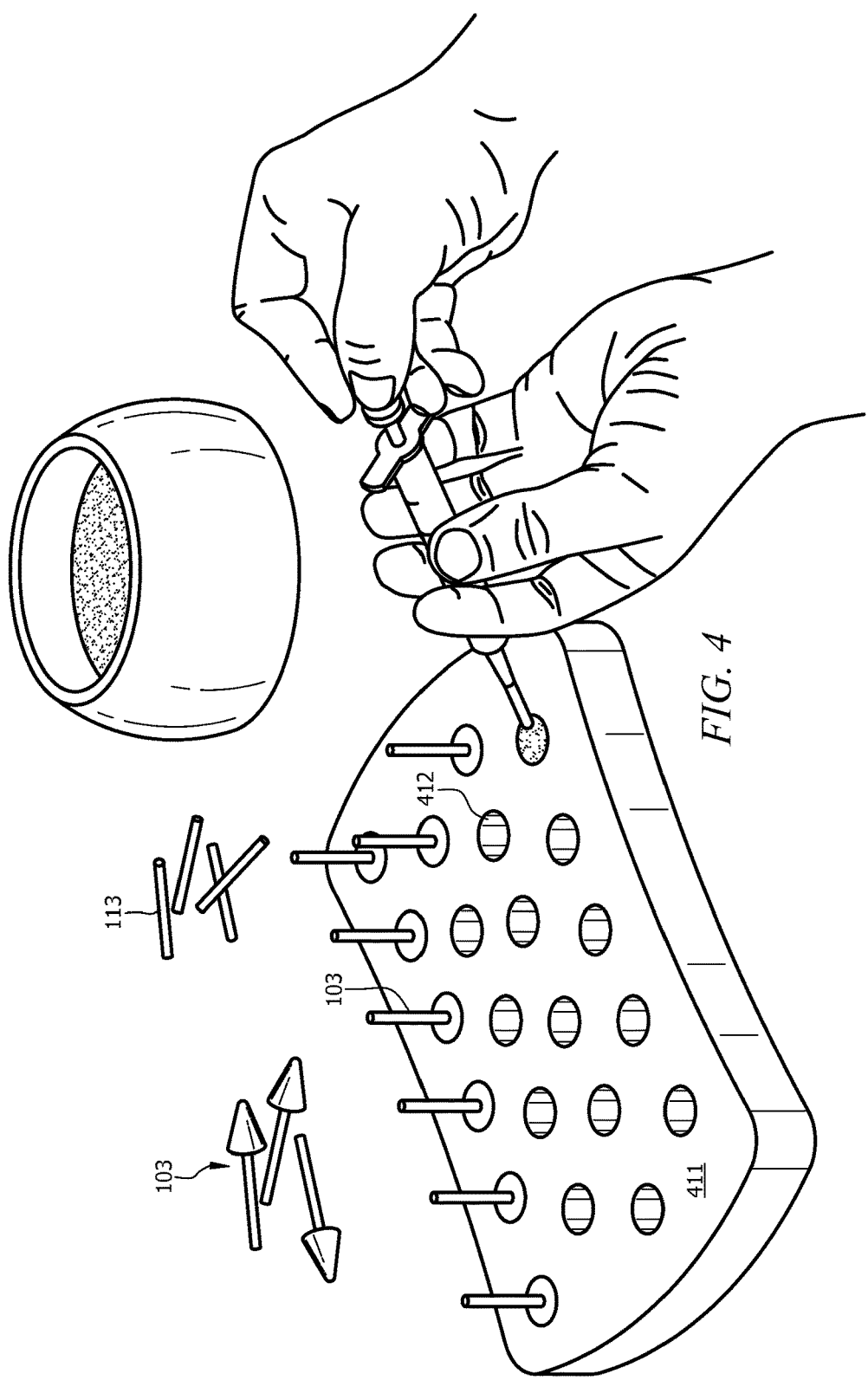
FIG. 4 is a perspective view of the wax being injected into the mold in one embodiment.

While the tool 100 and one method of using the tool 100 has been described, the method of making the tool 100, in one embodiment, will now be described. FIG. 3 is a perspective view of the wax tip 103 being manufactured in one embodiment. As depicted, the wax is being heated in a kettle. To prepare the wax, in one embodiment, the green and red wax ingredients discussed above are mixed in a 1:1 ratio. In other embodiments other ratios are acceptable. As an example, in one embodiment comprising Mosaic tile, a 1:4 blend is suitable and works great on small tile, porcelain tile, stained glass pieces. Thereafter the optional color die is added to provide the desired color. The mixture, in one embodiment, is melted at a temperature of about 190° F. After melting, the liquid wax is kept at a temperature of about 165° F. for a time of about 2 hours. This allows the wax to achieve the perfect use temperature for workability of the wax to the mold. After cooking, the wax is withdrawn from the kettle. As depicted in FIG. 2, the wax is depicted as being withdrawn with a syringe. This is for illustrative purposes and should not be deemed limiting. In one embodiment a 3 mL syringe is used as it is comfortable in a human hand. This allows 2-3 mL of wax to be withdrawn at a time. FIG. 4 is a perspective view of the wax being injected into the mold in one embodiment. As depicted, the wax in the syringe is injected into a mold 411. The mold 411 can comprise virtually any suitable material. In one embodiment the mold 411 comprises silicone. The mold 411, as depicted, comprises one or more cavities 412 which are to be filled or partially filled with the wax. The cavity can be formed with any method known in the art including etching or carving. As depicted, the cavities 412 comprise a conical shape, which will give the wax tip 103 the conical shape. Other shapes, words, logos, etc., can be applied to the final wax tip by controlling the mold 412. As depicted, a tubular portion 113, or stem, is inserted into the injected wax. The tubular portion 113, in one embodiment, comprises plastic. The tubular portion 113 couples to the wax as the wax hardens around the tubular portion 113. As noted, in one embodiment the tubular portion 113 is covered with wax as well to aid in the coupling of the tubular portion 113 to the wax portion of the wax tip 103. In one embodiment the wax tip 103 is allowed to set for 10-15 minutes to harden the wax.

While the invention has been particularly shown and described with reference to a preferred embodiment, it will be understood by those skilled in the art that various changes in form and detail may be made therein without departing from the spirit and scope of the invention.

ADDITIONAL DESCRIPTION

The following clauses are offered as further description of the disclosed invention.

Clause 1. A tool for applying items, said tool comprising:
a first end and a second end, said first and second ends coupled by a shaft;
wherein said first end comprises a wax tip, and wherein said second end comprises a hollow narrow extended portion.

Clause 2. The tool of any proceeding or preceding clause wherein said shaft is hollow, and wherein said tool further comprises a connector located within said shaft.

Clause 3. The tool of any proceeding or preceding clause further comprising an adapter, wherein said hollow narrow extended portion is coupled to said adapter.

Clause 4. The tool of any proceeding or preceding clause wherein said adapter is removeable.

Clause 5. The tool of any proceeding or preceding clause further comprising an adapter cover which couples and secures the adapter in place.

Clause 6. The tool of any proceeding or preceding clause wherein said wax tip comprises a wax portion and a tubular portion.

Clause 7. The tool of any proceeding or preceding clause wherein said wax tip comprises a conical shape.

Clause 8. The tool of any proceeding or preceding clause wherein tubular portion comprises a coating of wax.

Clause 9. The tool of any proceeding or preceding clause further comprising a grommet, wherein said grommet secures said wax tip within said connector.

Clause 10. The tool of any proceeding or preceding clause wherein said wax tip comprises a green wax and a red wax.

Clause 11. The tool of any proceeding or preceding clause wherein said green wax comprises 119012, SPRUE WAX 2-S9 GREEN.

Clause 12. The tool of any proceeding or preceding clause wherein said red wax comprises 119021, FERRIS 12 RED.

Clause 13. The tool of any proceeding or preceding clause wherein said shaft is hollow and encompasses a connector; wherein said wax tip comprises a conical wax portion and a tubular portion; wherein said tubular portion couples with a grommet to secure said wax tip within said connector; wherein said hollow narrow extended portion is coupled to an adapter; wherein said adapter is covered by an adapter cover, and wherein said hollow narrow extended portion extends through said adapter cover.

Clause 14. A method for making a tool, said method comprising the steps of:
a) preparing a wax;
b) melting a wax;
c) injecting said wax into a mold to form a wax portion;
d) inserting a tubular portion into said wax portion to form a wax tip;
e) inserting said wax tip into a connector located on a tool.

Clause 15. The method of any proceeding or preceding clause wherein said preparing a wax comprises adding 119012, SPRUE WAX 2-S9 GREEN and 119021, FERRIS 12 RED.

Clause 16. The method of any proceeding or preceding clause wherein said 119012, SPRUE WAX 2-S9 GREEN and 119021, FERRIS 12 RED are added in a 1:1 ratio.

Clause 17. A system for applying items, said system comprising:
a double ended hand tool comprising a first end and a second end, wherein said first end comprises a wax tip and wherein said second end comprises a narrow extended portion;
an object upon which a small craft item is to be adhered;
an adhesive for applying a small item to an object;
wherein said adhesive is placed upon said object;
wherein said adhesive comprises an adhesion which is greater than the adhesion of said wax tip;
whereby a user places said wax tip upon a small item, picking up said small item; whereby a user deposits said small item onto an adhesive;
whereby a user uses said narrow extended portion to position said small item.

Clause 18. The tool of any proceeding or preceding clause further comprising a shaft, wherein said shaft is hollow and encompasses a connector; wherein said wax tip comprises a conical wax portion and a tubular portion; wherein said tubular portion couples with a grommet to secure said wax tip within said connector; wherein said hollow narrow extended portion is coupled to an adapter; wherein said adapter is covered by an adapter cover, and wherein said hollow narrow extended portion extends through said adapter cover.

Clause 19. The tool of any proceeding or preceding clause wherein said small item comprises crystals.

What is claimed is:

1. A tool for applying items, said tool comprising:
   a wax tip, and wherein said wax tip is connected to a tubular portion, and wherein said wax tip comprises a conical shape;
      wherein said tubular portion is coupled to a first end of a hollow connector, and wherein an applicator is adjacent to a second end of said hollow connector, wherein said applicator comprises a conical extended portion;
      wherein said conical extended portion is hollow;
      wherein said hollow connector is located inside of a hollow shaft;
      an applicator cover which is coupled to said second end of said hollow connector, wherein said applicator cover surrounds said applicator and comprises a hole through which said conical extended portion extends;
      wherein said applicator is adjacent to said hollow shaft;
      wherein said tool comprises a first distal end opposite a second distal end, and wherein said wax tip is on a first distal end, and wherein conical extended portion is on said second distal end; and
      wherein said applicator cover and said conical extended portion are visible when said tool is properly assembled.

2. The tool of claim 1 wherein said conical extended portion and said wax tip are on opposite ends of said tool.

3. The tool of claim 1 wherein said tubular portion comprises a coating of wax.

4. The tool of claim 1 wherein said wax tip comprises a green wax and a red wax.

5. The tool of claim 1 wherein said applicator cover is located outside of said hollow shaft.

6. The tool of claim 1 wherein said applicator cover is removeably coupled to said hollow connector.

7. The tool of claim 1 wherein said applicator cover is adjacent to said hollow shaft.

8. The tool of claim 1 wherein said tool is a double ended hand tool.

9. A tool for applying items, said tool comprising:
   a wax tip, and wherein said wax tip is connected to a tubular portion, and wherein said wax tip comprises a conical shape;
      wherein said tubular portion is coupled to a first end of a hollow connector, and wherein an applicator is adjacent to a second end of said hollow connector, wherein said applicator comprises a conical extended portion;
      wherein said hollow connector is located inside of a hollow shaft;
      an applicator cover which is coupled to said second end of said hollow connector, wherein said applicator cover surrounds said applicator and comprises a hole through which said conical extended portion extends;
      wherein said applicator is adjacent to said hollow shaft;
      wherein said tool comprises a first distal end opposite a second distal end, and wherein said wax tip is on a first distal end, and wherein conical extended portion is on said second distal end;
      wherein said applicator cover and said conical extended portion are visible when said tool is properly assembled and;
      wherein said hollow connector comprises an enlarged diameter on its first end, and wherein said connector comprises threading on its second end, and wherein said applicator cover comprises threading such that when said applicator cover is coupled to said hollow connector, said hollow shaft is secured between the applicator cover and said enlarged diameter of said hollow connector.

10. A system for applying items, said system comprising:
    a double ended hand tool comprising a first distal end and a second distal end, wherein said first distal end comprises a wax tip comprising a wax tip adhesion and wherein said second distal end comprises an exposed conical extended portion;
    an object upon which a craft item is to be adhered;
    an adhesive for applying an item to an object;
    wherein said adhesive is placed upon said object;
    wherein said adhesive comprises an adhesion which is greater than the adhesion of said wax tip;
    whereby a user places said wax tip upon a small item, picking up said small item;
    whereby a user deposits said item onto said adhesive;
    whereby a user uses said exposed conical extended portion to position said item;
    and wherein said wax tip is connected to a tubular portion, and wherein said wax tip comprises a conical shape;
    wherein said tubular portion is coupled to a first end of a hollow connector, and wherein an applicator is adjacent to a second end of said hollow connector, wherein said conical extended portion is part of said applicator;
    wherein said hollow connector is located inside of a hollow shaft;
    an applicator cover which is coupled to said second end of said hollow connector, wherein said applicator cover surrounds said applicator and comprises a hole through which said conical extended portion extends;
    wherein said applicator is adjacent to said hollow shaft; and
    wherein said hollow connector comprises an enlarged diameter on its first end, and wherein said hollow connector comprises threading on its second end, and wherein said applicator cover comprises threading such that when said applicator cover is coupled to said hollow connector, said hollow shaft is secured between the applicator cover and said enlarged diameter of said hollow connector.

11. A tool for applying items, said tool comprising:
    a wax tip, and wherein said wax tip is connected to a tubular portion, and wherein said wax tip comprises a conical shape;
      wherein said tubular portion is coupled to a first end of a hollow connector, and wherein an applicator is adjacent to a second end of said hollow connector, wherein said applicator comprises a conical extended portion;
      wherein said hollow connector is located inside of a hollow shaft;
      an applicator cover which is coupled to said second end of said hollow connector, wherein said applicator cover surrounds said applicator and comprises a hole through which said conical extended portion extends;
      wherein said applicator is adjacent to said hollow shaft;
      wherein said tool comprises a first distal end opposite a second distal end, and wherein said wax tip is on a first distal end, and wherein conical extended portion is on said second distal end;

wherein said applicator cover and said conical extended portion are visible when said tool is properly assembled and;

wherein said applicator cover comprises threading, and wherein said connector comprises threading, and wherein said applicator cover is coupled to said hollow connector via said threadings.

* * * * *